(12) United States Patent
Bilski et al.

(10) Patent No.: US 8,658,047 B2
(45) Date of Patent: Feb. 25, 2014

(54) ADDITIVE DISPERSING FILTER AND METHOD

(75) Inventors: Gerard W. Bilski, Perrysburg, OH (US); Zafar Hussain, Perrysburg, OH (US)

(73) Assignee: Fram Group IP LLC, Lake Forest, IL (US)

( * ) Notice: Subject to any disclaimer, the term of this patent is extended or adjusted under 35 U.S.C. 154(b) by 136 days.

(21) Appl. No.: 13/178,096

(22) Filed: Jul. 7, 2011

(65) Prior Publication Data

US 2011/0272338 A1   Nov. 10, 2011

Related U.S. Application Data

(62) Division of application No. 12/030,595, filed on Feb. 13, 2008, now Pat. No. 7,998,346.

(60) Provisional application No. 60/889,728, filed on Feb. 13, 2007, provisional application No. 60/910,772, filed on Apr. 9, 2007, provisional application No. 60/985,193, filed on Nov. 2, 2007.

(51) Int. Cl.
*B01D 35/00* (2006.01)

(52) U.S. Cl.
USPC ......... 210/749; 210/206; 210/209; 210/416.5

(58) Field of Classification Search
USPC ............... 210/167.02, 167.04, 167.11, 167.3, 210/198.1, 201, 202, 209, 416.4, 416.5, 2, 210/206, 749; 123/1 A, 196 A; 137/268; 422/255, 256, 261, 275, 276, 277, 278, 422/279, 283
See application file for complete search history.

(56) References Cited

U.S. PATENT DOCUMENTS

| | | | |
|---|---|---|---|
| 4,377,485 | A | 3/1983 | Krofta |
| 6,379,564 | B1 | 4/2002 | Rohrbach et al. |
| 6,623,636 | B2 | 9/2003 | Rohrbach et al. |
| 2005/0019236 | A1 | 1/2005 | Martin et al. |
| 2005/0040092 | A1 | 2/2005 | Eilers et al. |
| 2005/0167351 | A1 | 8/2005 | Herman et al. |
| 2005/0194301 | A1* | 9/2005 | Hacker et al. ................. 210/209 |

FOREIGN PATENT DOCUMENTS

| | | |
|---|---|---|
| DE | 102005003963 A1 | 8/2005 |
| WO | 03055810 A1 | 7/2003 |
| WO | 2006137969 A2 | 12/2006 |

OTHER PUBLICATIONS

International Search Report Dated Jun. 25, 2008, International Application No. PCT/US2008/053843.
Supplementary European Search Report dated Mar. 1, 2011.
Written Opinion of International Searching Authority Dated Jun. 25, 2008, International Application No. PCT/US2008/053843.
International Search Report Dated Aug. 22, 2011; International Application No. PCT/US2010/062332.
Written Opinion of International Searching Authority Dated Aug. 22, 2011; International Application No. PCT/US2010/062332.

* cited by examiner

*Primary Examiner* — Lucas Stelling
(74) *Attorney, Agent, or Firm* — Erin J. Fox; Barnes & Thornburg LLP

(57) ABSTRACT

A method for dispersing an additive from an additive cartridge disposed in a housing of an oil filter is provided herein, the method includes using stagnation pressure to disperse the additive from the additive cartridge; and regulating a flow rate of the additive from the additive cartridge by restricting an inlet opening of an outlet tube of the additive cartridge.

22 Claims, 15 Drawing Sheets

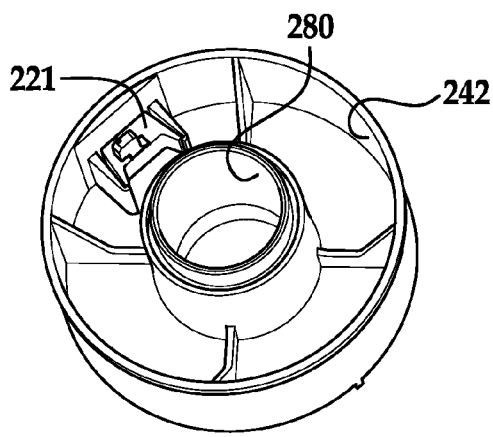 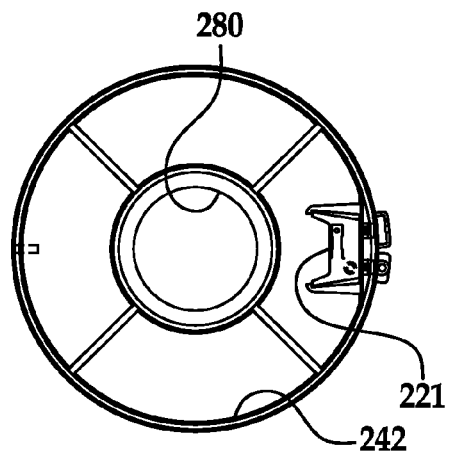
FIG. 21A    FIG. 21B
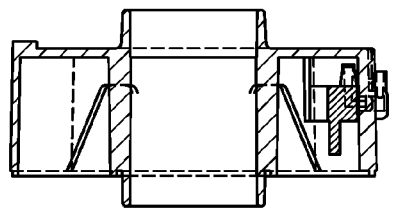
FIG. 21C
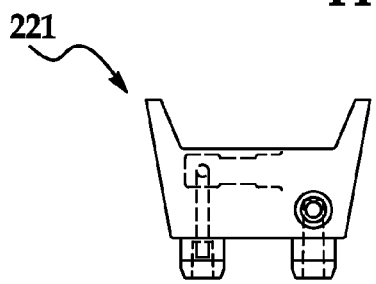 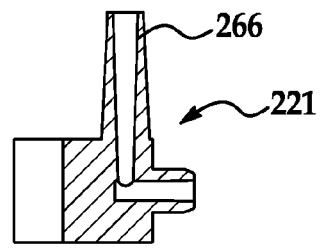
FIG. 22A    FIG. 22B
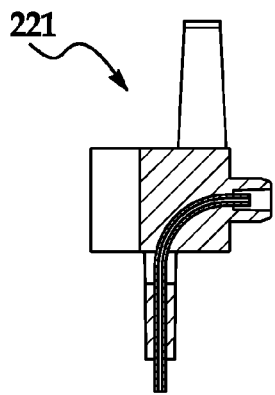 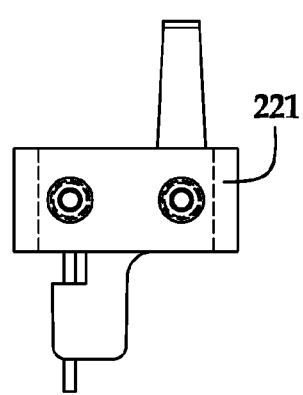 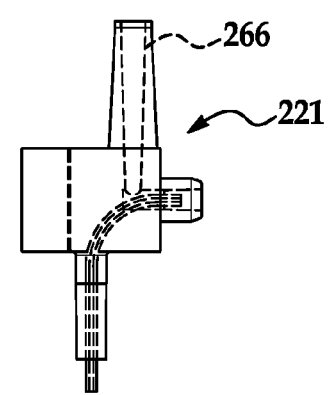
FIG. 22C    FIG. 22D    FIG. 22E

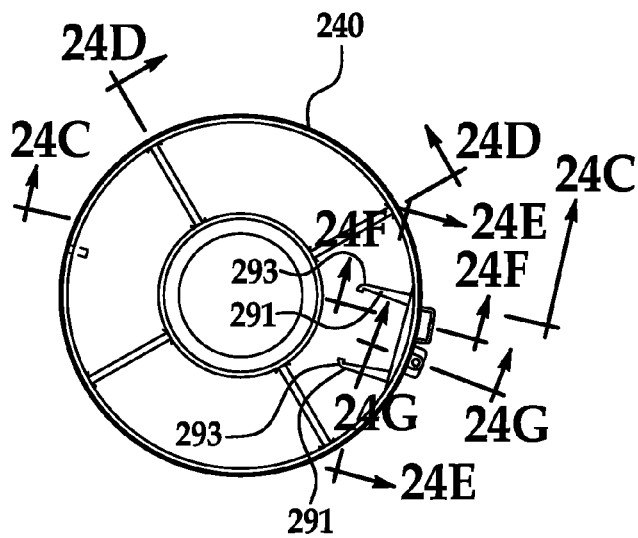
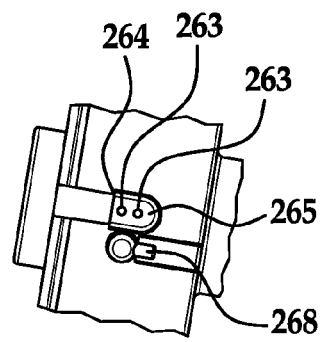
FIG. 24A
FIG. 24B
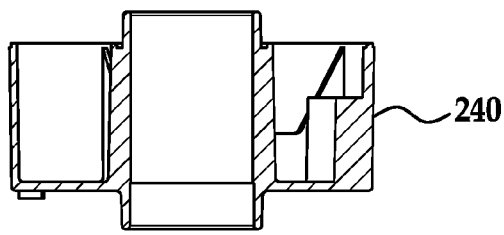
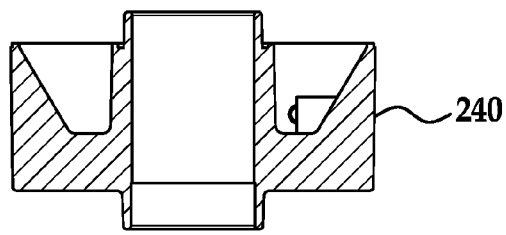
FIG. 24C
FIG. 24D
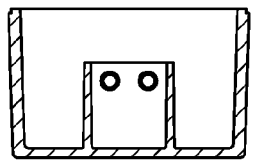
FIG. 24E
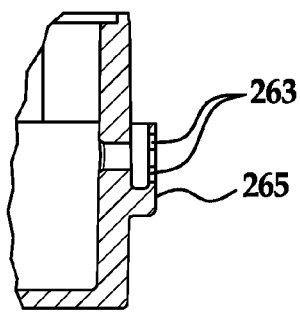
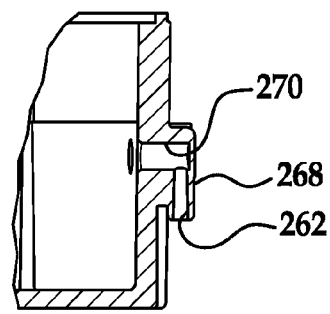
FIG. 24F
FIG. 24G

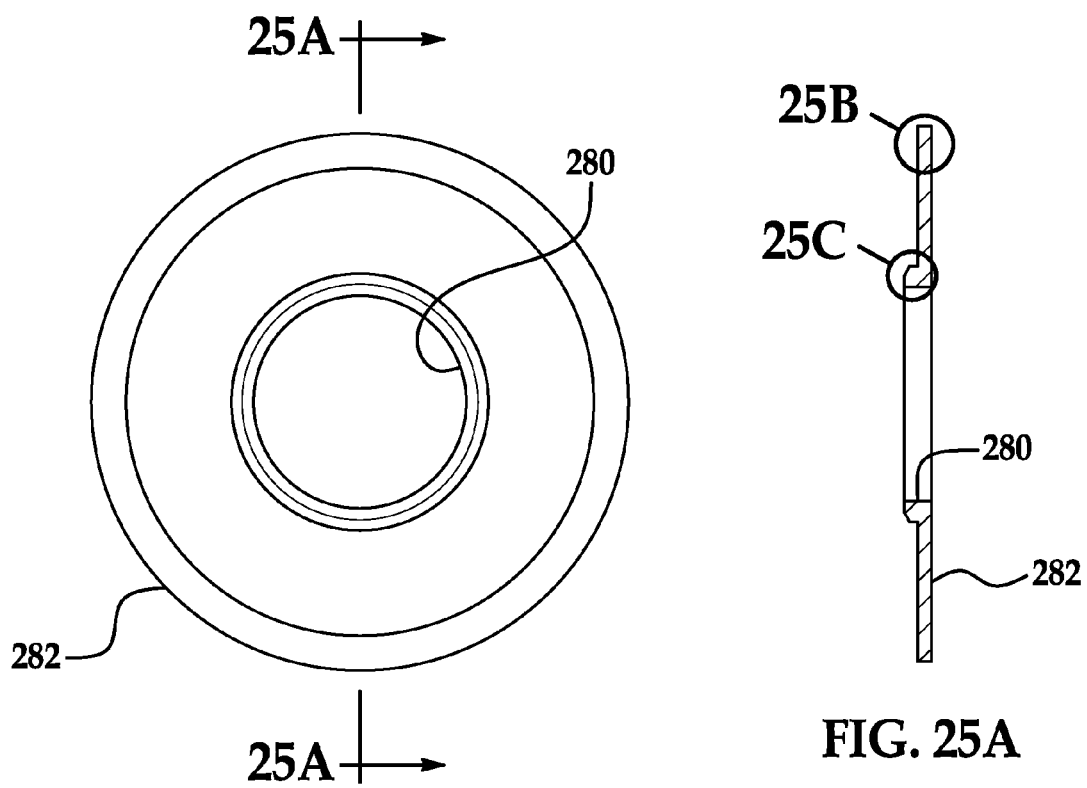
FIG. 25
FIG. 25A
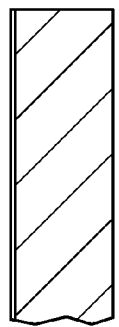
FIG. 25B
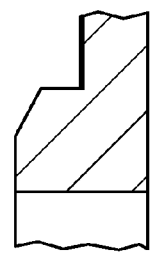
FIG. 25C

ADDITIVE DISPERSING FILTER AND METHOD

CROSS REFERENCE TO RELATED APPLICATIONS

The present application is a divisional of U.S. patent application Ser. No. 12/030,595 filed Feb. 13, 2008, which claims the benefit of the following provisional patent applications, Ser. No. 60/889,728, filed Feb. 13, 2007; Ser. No. 60/910,772 filed Apr. 9, 2007; and Ser. No. 60/985,193 filed Nov. 2, 2007 the contents each of which are incorporated herein by reference thereto.

BACKGROUND

Exemplary embodiments of the present invention relate to an additive dispersing filter and method of dispersing an additive to a fluid passing through the filter.

Many different types of fluid filters are known. Most such filters use a mechanical or 'screening' type of filtration, with a porous filter element disposed therein. The oil is repeatedly cycled through the filter element to remove impurities.

In the oil filtration art, it is well known that normal operation of an internal combustion engine, particularly a diesel engine, results in the formation of contaminants. These contaminants include, among others, soot, which is formed from incomplete combustion of the fossil fuel, and acids that result from combustion. These contaminants are typically introduced into the lubricating oil during engine operation, and tend to increase oil viscosity and generate unwanted engine deposits, leading to increased engine wear.

The conventional solution to these problems has been to place various additives into lubricating oils, during their initial formulation. To combat soot-related problems, many conventional lubricating oils include dispersants that resist agglomeration of soot therein. These work well for a short period, but may become depleted. Additionally, due to the solubility and chemical stability limits of these dispersants in the oil, the service lives of the lubricating oil and the oil filter are less than optimal.

To counteract the effects of acidic combustion products, many conventional motor oils include neutralizing additives known as over-based detergents. These are a source of TBN (total base number), which is a measure of the quantity of the over-based detergent in the oil. The depletion of the TBN is an important limiting factor for many internal combustion engines, particularly for heavy-duty applications with diesel engines.

To improve engine protection and to combat other problems, conventional lubricating oils often include one or more further additives, which may be corrosion inhibitors, antioxidants, friction modifiers, pour point depressants, detergents, viscosity index improvers, anti-wear agents, and/or extreme pressure additives. While the inclusion of these further additives may be beneficial, the amount and concentration of these additives, using conventional methods, are limited by the ability of lubricating oils to suspend these additives, as well as by the chemical stability of these additives in the oil.

While the known filters are usable for their intended purposes, the release of supplemental additives from the known filters often takes place either immediately after installation or more rapidly than is needed for protecting the oil. Subsequently, after some time has elapsed, there may be little or no additive left in the filter.

Another problem with many of the known filter designs is that beneficial additives are added to the oil before the oil is mechanically filtered through a filter element. As a result, when the oil is mechanically filtered, some of the beneficial additives that have just been added may be immediately filtered out.

Moreover, recent emission regulations require heavy/medium duty diesel engines to run at conditions that deteriorate the crank case lube oil additive package at an accelerated rate. This leads to a reduction in the number of miles a truck can travel before the crank case oil needs to be changed, causing increase in downtime and operating costs of the truck, and thus reducing profits for the owner.

Therefore it is desirable to provide a filter having an additive incorporated therein, wherein the additive is slowly released over the useful life of the filter. It is also desirable to provide an oil filter which could extend the useful life of engine oil so as to allow a user to extend the time interval between oil changes of an engine.

SUMMARY OF THE INVENTION

Additive dispersing filters and methods of additive dispersant are provided. Exemplary embodiments of the present invention are directed to a method for dispersing an additive from an additive cartridge disposed in a housing of an oil filter is provided herein, the method includes using stagnation pressure to disperse the additive from the additive cartridge; and regulating a flow rate of the additive from the additive cartridge by restricting an inlet opening of an outlet tube of the additive cartridge.

In accordance with another exemplary embodiment of the present invention an additive cartridge for dispersing an additive within a filter housing is provided, the additive cartridge comprising: a housing defining a receiving area for receipt of the additive; a fluid inlet path through a wall of the housing, the fluid inlet path providing a means for increasing a pressure within the receiving area, the fluid inlet path having an inlet opening disposed adjacent to an outer wall portion of the housing; and a fluid outlet path through the wall of the housing, the fluid outlet path providing a means for dispersing the additive from the receiving area when the pressure within the receiving area exceeds a predetermined value, the fluid outlet path having an outlet opening disposed adjacent to the outer wall portion of the housing, the outlet opening being covered by a shroud configured to deflect fluid flowing in a first direction away from the outlet opening and the inlet opening of the fluid inlet path is positioned to receive fluid flowing in the first direction; and fluid flow of the additive through the fluid outlet path is controlled by varying an inlet opening of the fluid outlet path.

In accordance with another exemplary embodiment of the present invention a filter is provided, the filter comprising: a filter housing defining an inlet fluid opening and an outlet fluid opening, the inlet fluid opening and the outlet fluid opening defining a fluid path through the filter; a filter element disposed inside the filter housing, the filter element being disposed in the flow path such that fluid flows through the filter element; and an additive cartridge for dispersing an additive within the filter housing, the additive cartridge comprising: a housing defining a receiving area for receipt of the additive; a fluid inlet path through a wall of the housing, the fluid inlet path providing a means for increasing a pressure within the receiving area, the fluid inlet path having an inlet opening disposed adjacent to an outer wall portion of the housing; and a fluid outlet path through the wall of the housing, the fluid outlet path providing a means for dispersing the additive from the receiving area when the pressure within the receiving area exceeds a predetermined value, the fluid outlet path having an outlet opening disposed adjacent to the outer wall portion of the housing, the outlet opening being covered by a shroud configured to deflect fluid flowing in a first direction away from the outlet opening and the inlet opening of the fluid inlet path is positioned to receive fluid flowing in the first direction; and fluid flow of the additive through the fluid outlet path is controlled by varying an inlet opening of the fluid outlet path.

The above-described and other features are appreciated and understood by those skilled in the art from the following detailed description, drawings, and appended claims.

DESCRIPTION OF THE DRAWINGS

FIGS. 14-25C are views illustrating an additive cartridge or portions thereof in accordance with exemplary embodiments of the present invention.

DETAILED DESCRIPTION OF EXEMPLARY EMBODIMENTS

Figure 1:
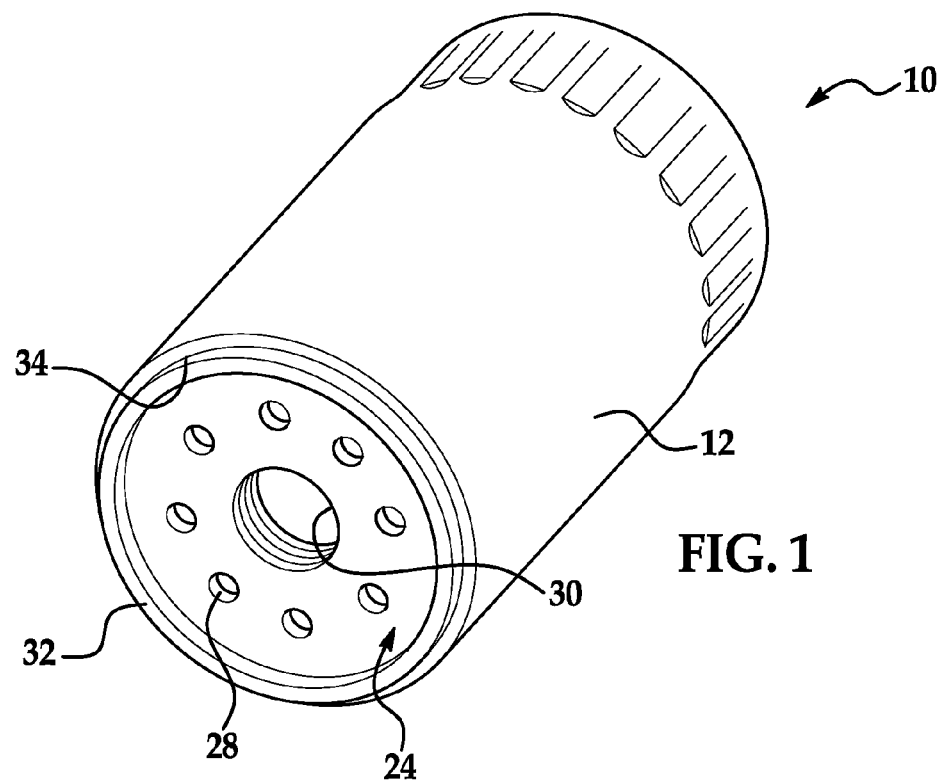
FIG. 1 is a perspective view of an oil filter constructed in accordance with an exemplary embodiment of the present invention.

The present application is related to the following patent applications, the contents each of which are incorporated herein by reference thereto: Ser. No. 10/352,344, filed Jan. 27, 2003; Ser. No. 09/867,973, filed May 30, 2001; Ser. No. 09/566,034 filed May 8, 2000; U.S. patent application Ser. No. 10/863,581, filed Jun. 8, 2004; U.S. patent application Ser. No. 11/488,466, filed Jul. 18, 2006; U.S. patent application Ser. No. 11/533,649 filed Sep. 20, 2006; U.S. patent application Ser. No. 11/845,042, filed Aug. 25, 2007; U.S. patent application Ser. No. 11/845,043, filed Aug. 25, 2007; U.S. patent application Ser. No. 11/846,265, filed Aug. 28, 2007; U.S. provisional patent application Ser. No. 60/889,728, filed Feb. 13, 2007; U.S. provisional patent application Ser. No. 60/910,772 filed Apr. 9, 2007; and U.S. provisional patent application Ser. No. 60/985,193 filed Nov. 2, 2007, the contents each of which are incorporated herein by reference thereto.

For the purposes of promoting an understanding of the principles of the present invention, reference will now be made to the exemplary embodiments illustrated herein, and specific language will be used to describe the same. It will nevertheless be understood that no limitation of the scope of the invention is thereby intended. Any alterations and further modifications of the described filters, cartridges, and processes, and any further applications of the principles of the invention as described herein, are contemplated as would normally occur to one skilled in the art to which the invention relates.

In accordance with exemplary embodiments of the present invention, a filter and method of making a filter is disclosed. In an exemplary embodiment the filter will comprise an additive cartridge for providing a means for introducing an additive into oil passing through the filter. In addition, an additive cartridge and method of making the same are also disclosed wherein the cartridge provides a means for retaining an additive for dispersement into the oil over a period of time.

In development of a filter used to extend oil changes a means is required to continuously disperse a small quantity of liquid additive over an extended period of time. This is very difficult to get accurate dispense rates due to the extremely low volumetric rate in the filter or additive cartridge. Exemplary embodiments are directed a means for providing accurate dispense rates for a liquid additive.

In accordance with an exemplary embodiment of the invention the additive cartridge employs the fluid velocity through the oil filter to create a stagnation pressure in the additive container with a controlled diameter outlet tube of sufficient length at another point in the container to create a controlled release of additive based on the stagnation pressure driving flow through the tube and out of the additive cartridge. The flow can be calculated using Darcy's equation and adjusted based upon to inner diameter (ID) or length of the tube.

To create stagnation pressure a tube or inlet fluid path with an opening facing the fluid flow is located in the flow stream. The tube opening is placed in a location that exhibits the intended rate of flow to get the desired stagnation pressure. In one non-limiting exemplary embodiment the tube opening is placed equidistant between the body wall and additive housing to be in a more laminar velocity flow path. The opening is also placed far enough below the additive housing edge to eliminate turbulence. The inlet opening of the inlet fluid path is above the additive level so drainage during off times does not occur however, the inlet could be placed at other locations if a shut off valve is used. In one exemplary embodiment, a spring biased one way valve is used wherein the valve only opens when a sufficient pressure is generated at one end of the valve. In addition, the outlet opening of the inlet tube or path is disposed above the level of the additive so that during engine shut down or when no fluid is flowing through the filter, the pressure between the additive cartridge and the interior of the filter housing can equalize without dispersing the additive from the additive cartridge.

An outlet tube or outlet flow path with an inlet opening is placed at the bottom of the additive housing and as the additive is displaced a portion of the tube may extend above the additive level. Again the tube could be preferentially capped during no flow conditions and located at other locations. Of course, other tube configurations are contemplated to be within the scope of exemplary embodiments of the present invention. In one, exemplary embodiment, a shield covers the outlet tube creating an iso-static pressure region so no additional pressure areas are created.

In accordance with an exemplary embodiment and for the additive displacement to occur flow is directed through filter inlet openings and down the side wall between the additive housing and the filter housing wall causing a known fluid velocity. Knowing the velocity and the density of the flowing liquid or oil the stagnation pressure can be calculated. The stagnation pressure creates a differential pressure across the outlet tube and flow can be calculated based upon pressure, diameter, length and viscosity using Darcy's equation.

Figure 2:
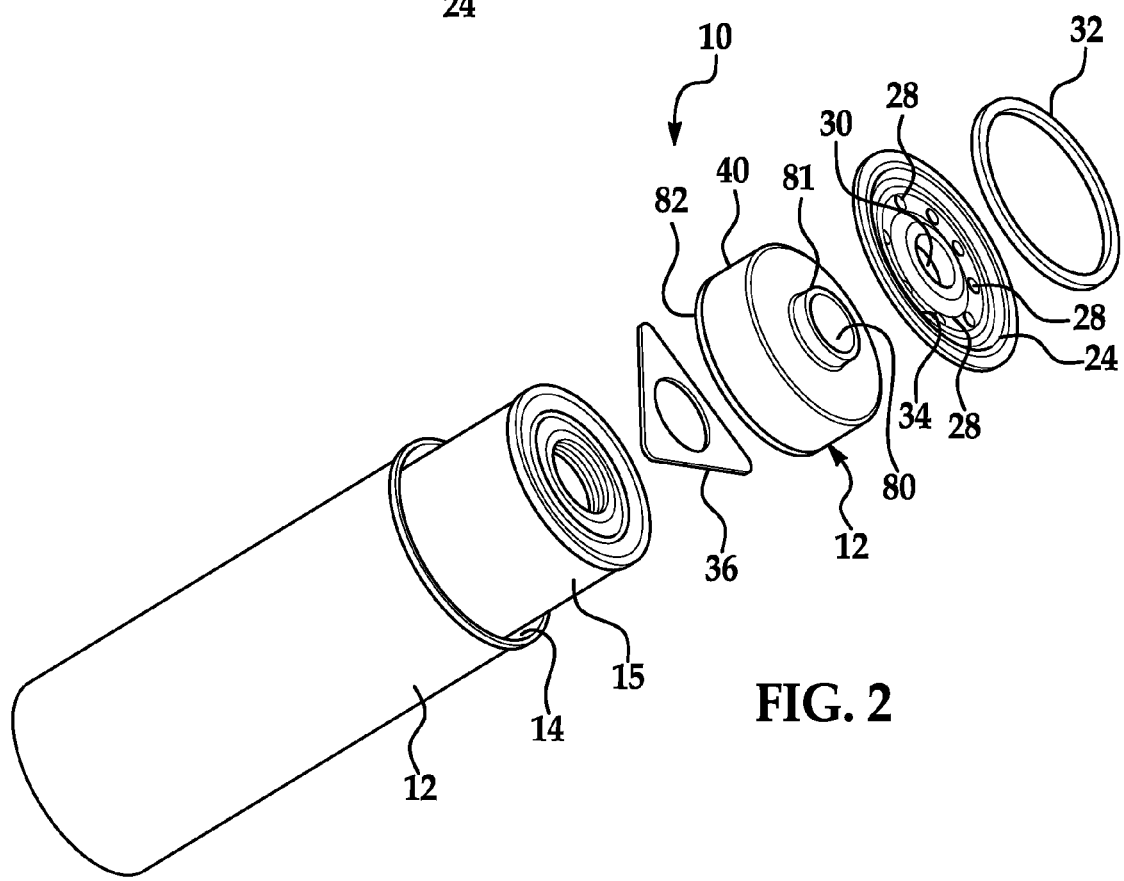
FIG. 2 is an exploded perspective view of an oil filter constructed in accordance with an exemplary embodiment of the present invention.
Figure 3:
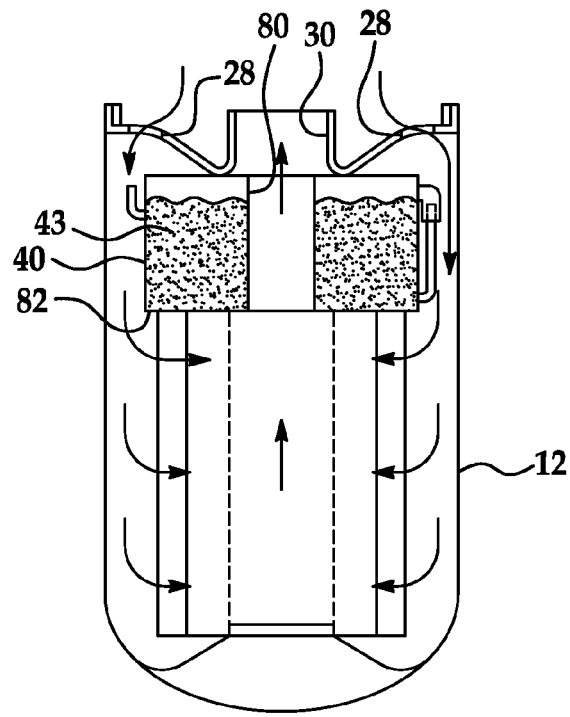
FIG. 3 is a cross-sectional view of an oil filter with an additive cartridge in accordance with an exemplary embodiment of the present invention.

Referring to FIGS. 1 and 2, there is shown an oil filter 10 according to a first exemplary embodiment of this invention. The oil filter generally includes a hollow cylindrical housing 12 which defines a hollow interior chamber 14, a porous, mechanical filter element 15 within that chamber, and a centrally located additive cartridge 18 that is also retained inside the interior chamber 14.

The housing also includes a base plate 24 sealingly attached to the case or housing. A foraminous center tube may, optionally, be provided within the filter housing to supportively reinforce the mechanical filter element thereon.

The housing base plate includes a plurality of inlet ports 28 formed therethrough and arranged in a circular pattern. The base plate also includes a central outlet port 30. The outlet port has a plurality of female threads formed therein, to allow rotatable mounting of the filter on an externally threaded hollow tubular fitting on an engine block (not shown). An annular external seal or gasket 32 fits engagingly into a groove formed at the bottom surface of the base plate, to resist oil leakage outwardly from the base of the filter. A gasket 36 is disposed between additive cartridge or basket 18 and the mechanical filter element.

In the exemplary embodiment illustrated in FIGS. 1-2, the mechanical filter element 15 includes a conventional cylindrical member made of accordion-pleated filter paper. Alternatively, the filter element may be manufactured in accordance with the teachings of U.S. patent application Ser. No. 11/533,649, filed Sep. 20, 2006; and/or U.S. provisional patent application Ser. No. 11/845,042, filed Aug. 25, 2006; the contents of each of which are incorporated herein by reference thereto.

In accordance with an exemplary embodiment of the present invention an outer periphery of the additive cartridge is spaced from an inner surface of the housing such that the area of the fluid flowing past the additive cartridge is known and the velocity of the fluid passing past the inlet opening of the inlet flow path of the additive cartridge can be calculated.

Referring now to FIGS. 3-11, exemplary embodiments of an additive cartridge in accordance with the present invention is illustrated. Additive cartridge 18 includes a housing portion 40 having an exterior wall 44 and an interior wall 46 that are concentric and define a chamber 42 therebetween. A liquid additive 43 is deposited in chamber 42 for release into the filter in accordance with an exemplary embodiment of the present invention. After a liquid additive is added to chamber 42 a cap 82 that is configured to be secured to housing 40 is secured to the housing after the additive or additives are disposed therein. It being understood that in one embodiment and once cap 82 is secured to the housing the housing is oriented in the filter so that cap 82 is at the bottom of the housing in other words, cap 82 is further from the inlet openings of the filter (see FIG. 2). Housing portion 40 and cap 82 of additive cartridge 18 are configured to provide an outlet path 80, which is in fluid communication with opening 30 so that filtered oil or fluid may pass therethrough. In the illustrated exemplary embodiment, chamber 42 is concentric about outlet path 80.

An entrance port or inlet opening 62 provides an opening that extends through an entrance channel or inlet path 70 through exterior wall 44. Similarly, an exit port or outlet opening 64 provides an opening that extends through an exit channel or outlet path 72 in exterior wall 44. A shroud or canopy 65 is positioned over outlet port 64 to create an isostatic pressure region so no additional pressure areas are created. In addition, the canopy 65 is also configured to have an opening or openings 63, which prevent negative pressures in the oil filter housing from sucking or pulling the additive from the additive chamber which will result in undesirable dispersement of the additive or uncontrolled flow rate. Both entrance port or inlet opening 62 and exit port or outlet opening 64 provide an inlet path or pathway for fluid and/or liquid in interior chamber 14 to enter chamber 42 of housing 40. Preferably, entrance port or inlet opening 62 is located below a top edge 48 of housing 40 on exterior wall 44 to minimize turbulence from the fluids flowing through the filter.

In accordance with exemplary embodiments of the present invention additive cartridge 18 can be provided with entrance and exit ports 62, 64 as an integrated one-piece structure, or alternatively, as a two-piece (or more) structure(s), in which the pieces are interconnected via a connection. The connection can be a threaded connection sealed with adhesive, snap-fit, ultra-sonic welded, or spin-welded, as desired.

In an exemplary embodiment, entrance port 62 is provided as an inlet tube or opening or pitot tube 68 that faces the inlet fluid flow of the filter. In this embodiment, inlet tube or opening tube 68 provides a fluid conduit for liquid in interior chamber 14 to flow through exterior wall 44 to an outlet port 66 that opens into chamber 42. In the present exemplary embodiment, outlet port 66 is disposed above the additive level so that drainage during off times does not occur. Here, the pressure differential between the inner chamber of the additive cartridge and the inner housing of the fluid filter can equalize through reverse fluid flow back through the inlet path without dispersing more additive during engine shut down.

In other exemplary embodiments, outlet port 66 can be disposed beneath or at the additive level if a shut off valve is utilized. In this embodiment, the shut off valve would cover outlet port or outlet opening 66 and provide a means for allowing fluid to travel into the housing in one direction only. Preferably, the length and/or diameter of inlet tube or opening tube 68 can be selected to take advantage of the fluid pressure generated by the liquid flowing through filter 10 and to create a controlled release of additive based on the stagnation pressure driving flow through an outlet path of the additive cartridge in accordance with an exemplary embodiment of the present invention.

In exemplary embodiments, an inlet fluid path (e.g., the fluid path between entrance port 62 and port 66) can comprise a "U" shaped or "L" or other shaped geometry to connect entrance port 62 to outlet port 66 through entrance channel or inlet path 70 and other necessary fluid path conduits. In this manner, inlet tube 68 will provide entrance channel or path 70, with an outer leg portion that opens to the inlet fluid flow of the filter through entrance port 62 between the additive housing and the filter housing wall, and an inner leg portion that opens to the chamber 42 through outlet port 66 into the air pocket above the additive level in additive chamber 42.

By connecting the outlet port of the inner leg of a U-tube shaped or "L" or other shaped inlet tube in the pressure in the air pocket area above the additive level in the additive chamber, the initial release of additive into the liquid flow can be more effectively controlled. Static pressure and flow test results in exemplary embodiments have indicated that the use stagnation pressure created by the fluid flow of the fluid flowing through the filter to create pressure in chamber 42, can reduce the initial release of additive by 50% or more. For instance, in one exemplary embodiment, and by controlling the orifice or inlet opening of the outlet path was found to reduce the initial additive release from range of about 20-30% of the total additive to less than 10% of the total additive.

Therefore, in exemplary embodiments of the present invention in which an inlet fluid path is used to create a stagnation pressure in the additive cartridge, the amount of supplemental additives will be less likely to be immediately filtered out of the engine oil upon initial release and can provide for a longer-lasting slow-release of additive, thereby extending the useful life of engine oil so as to allow a user to extend the time interval between oil changes of an engine.

In accordance with an exemplary embodiment of the present invention an outlet tube or path 74 extends from an inlet port or opening 76 located beneath the additive level within chamber 42 through channel 72 in the housing wall. In an exemplary embodiment, outlet tube 74 extends adjacent exterior wall 44 to an inlet port 76 that is proximate to the bottom of chamber 42. In other exemplary embodiments, outlet tube or path 76 could be disposed elsewhere. In one non-limiting exemplary embodiment, a shut off valve is used with outlet tube 74 that can be closed during no flow conditions.

Inlet tube or path 68 is disposed in a location that exhibits the intended rate of fluid flow to achieve the desired stagnation pressure. In an exemplary embodiment, inlet tube or path 68 can be disposed equidistant between the filter housing 12 and cartridge housing 40 so as to receive fluid flow having a laminar velocity. Inlet tube or path 68 and entrance port or inlet opening 62 can be provided in a variety of configurations including a round, oval, flattened configuration, or configured to conform to the space between the exterior of the filter element and the interior of the housing.

As described above, the opposite end of inlet tube or inlet path 68 from entrance port or inlet opening 62 extends to an outlet port 66 that opens into chamber 42. In the illustrated embodiment, inlet tube or opening tube 68 extends from entrance port 62 a desired length adjacent to exterior wall 44. The fluid flowing into the chamber is used to create a controlled release of additive based on the stagnation pressure driving fluid flow through the outlet tube or outlet flow path. In one exemplary embodiment it is preferable that the incoming liquid mix sufficiently with the additive contained within chamber 42. Adequate mixing of the liquid and additive can be promoted by increasing the period of time that the liquid remains in chamber 42, as well as by increasing the distance that the incoming liquid must flow in the chamber before exiting out an exit port or opening 64.

During operation of the present exemplary embodiment, the differential density between the liquid and the additive can be utilized to achieve a more uniform release rate over time. Generally, the liquid additive is denser than the liquid flowing through the filter. Consequently, the liquid being filtered tends to "float" on the additive phase. Truncating outlet port or opening 66 near the top of the additive vessel, and extending outlet tube or flow path 74 proximate to the bottom of chamber 42 takes advantage of this property. During operation, the liquid enters chamber 42 through outlet opening 66 of the inlet path, floats, and remains (largely, with exception of the slow diffusion between phases) at the top of the chamber or layered on the liquid additive. As more of the liquid enters through opening 66, the entering liquid displaces pure additive and pushes it out outlet tube or outlet path 74 in nearly full-concentration to yield a very steady injection of active ingredient into the system.

Exit port or outlet opening 64 is spaced lower than opening 62 on exterior wall 44 and, in the illustrated embodiment, centrally positioned in exterior wall 44 to extend centrally into chamber 42. It will be understood, however, that outlet opening 64 can be positioned as desired in exterior wall 44 to extend into and/or through any portion of chamber 42. As illustrated in the present exemplary embodiment, outlet opening 64 leads into an outlet tube 74 extending into chamber 42. Outlet tube 74 provides a conduit between chamber 42 and exit port 64. As discussed above a shield or shroud covers opening 64 that is in fluid communication with inlet opening 76 of outlet tube 74 to create an isostatic pressure region to ensure that no additional pressure areas are created.

In an exemplary embodiment, exit port 64 can provide fluid communication between the liquid additive in chamber 42 via outlet tube 74 and ultimately central outlet port 30 for liquid and additive that was initially located in chamber 42 as well as the filter and is entering outlet path 80 as it exits the filter. Thereafter the filtered and additized liquid flows from outlet path 80 into the device filter 10 is secured to and then back into the filter, which can used in any one of a recirculating fuel system, coolant, oil, or lubricant system, or a single-pass fuel system.

Optionally, entrance port 62 and/or exit port 64 can be sealed with a soluble seal. This allows filter 10 to be storage stable, and in particular, this can inhibit loss of activity and/or volume of the additive in chamber 42. In use, a liquid flowing through filter 10 dissolves the seal material, allowing the liquid to enter into chamber 42 and mix with the additive therein. Alternatively, the soluble seal can be composed of a low melting material that melts when exposed to the normal operating temperatures of the fuel flowing through the filter. In one exemplary embodiment, the liquid is an organic base fluid such as fuel, oil, or a lubricant, and the soluble seal is composed of a material such as a wax that is soluble in organic solvents.

In use, the liquid to be filtered flows in through inlet ports 28, and from there into housing chamber 14. In the illustrated exemplary embodiment, the liquid flows down between filter housing 12 and cartridge housing 40 into inlet tube or opening tube 68. The liquid flowing through a filter such as that of FIGS. 1 and 2 will exhibit a known fluid velocity. The stagnation pressure can thus be calculated from the velocity and density of the flowing liquid. Exemplary embodiments of the present invention can take advantage of the stagnation pressure by creating a differential pressure between entrance port 62 and exit port 64. Since entrance port 62, like inlet tube or opening tube 68, is aligned perpendicularly with the direction of flow, a stagnation zone forms in front of the inlet tube or opening tube that causes the dynamic pressure to be converted to a static pressure that is harnessed to drive flow slowly into the inlet tube or opening tube and through the vessel. The flow can then be calculated based upon the pressure drop, inlet tube or opening tube diameter and length, and the viscosity using Darcy's Law, and the inlet tube or opening tube diameter and length can be adjusted to achieve the desired flow, and thereby tailor the release rate of liquid additive, in exemplary embodiments.

Figure 4:
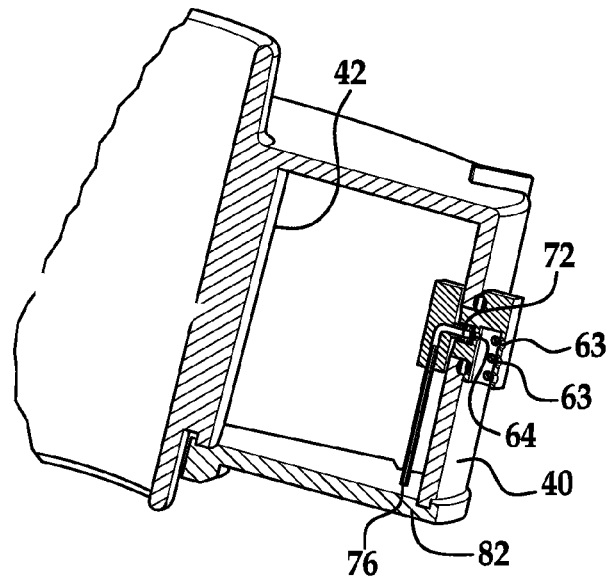
FIGS. 4-11E are views illustrating an additive cartridge or portions thereof in accordance with exemplary embodiments of the present invention.
Figure 5:
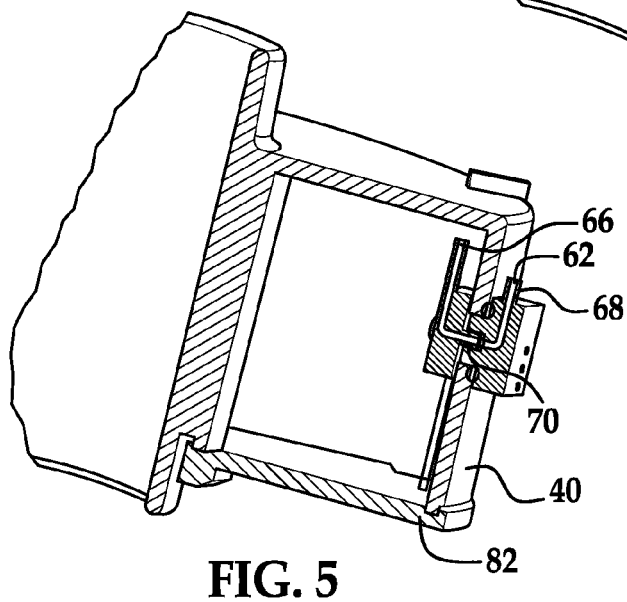
Figure 6:
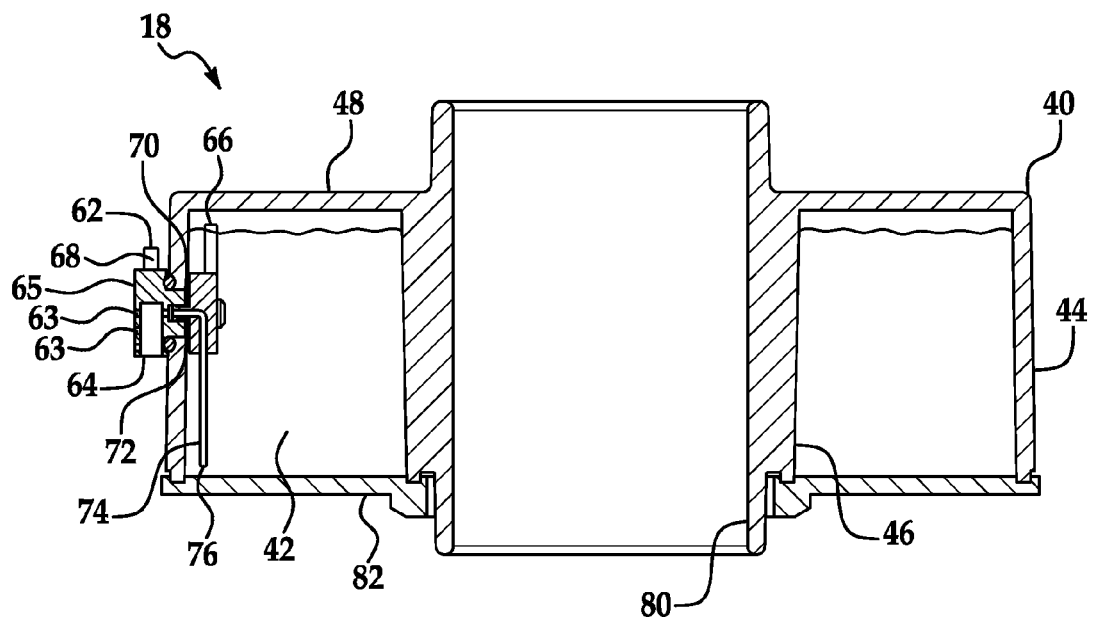
Figure 7:
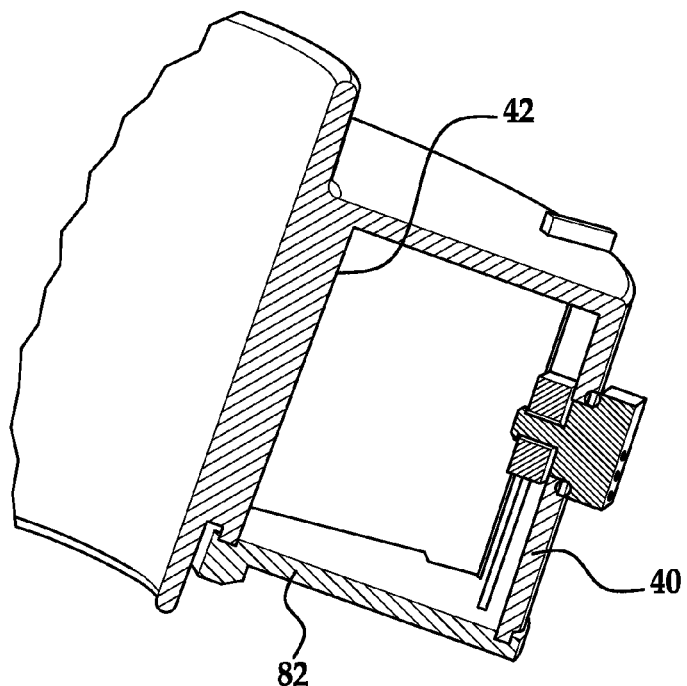
Figure 8:
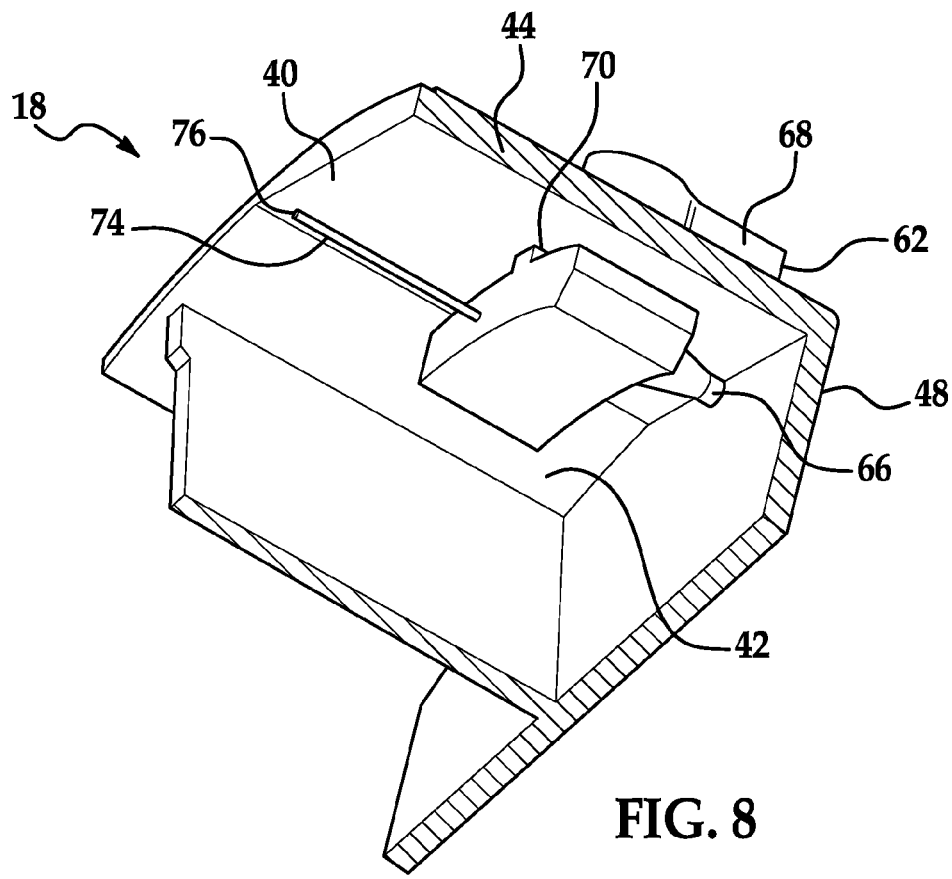
Figure 9:
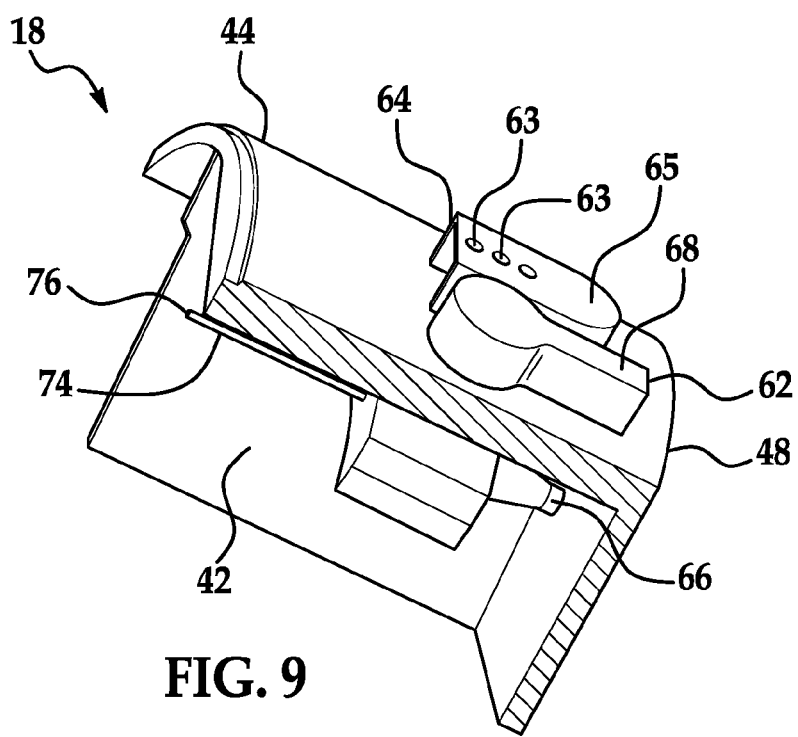
Figure 10:
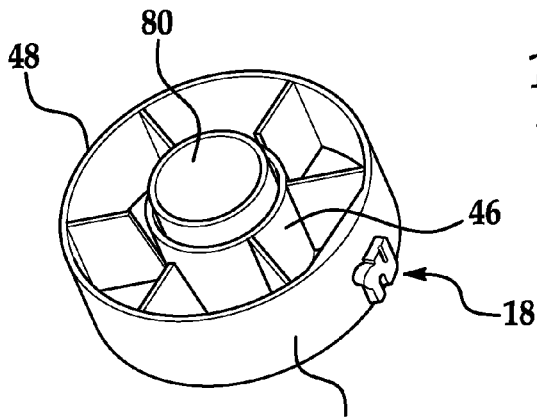
Figure 10A:
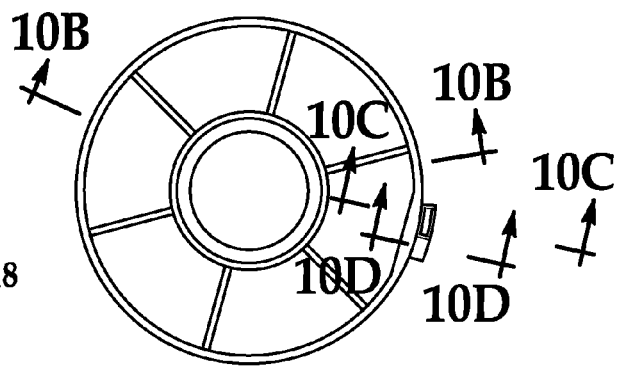
Figure 10B:
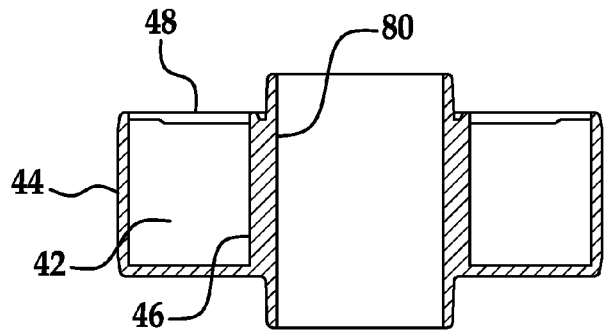
Figure 10C:
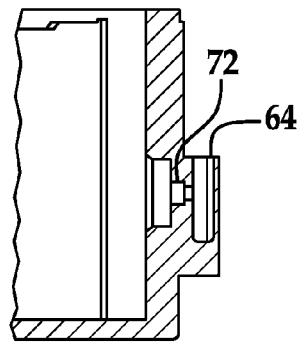
Figure 10D:
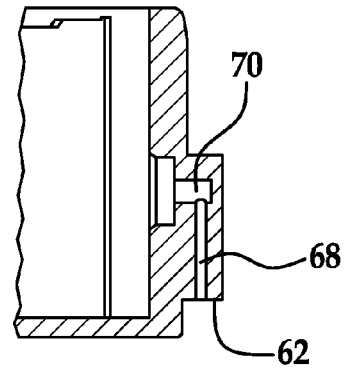
Figure 11A:
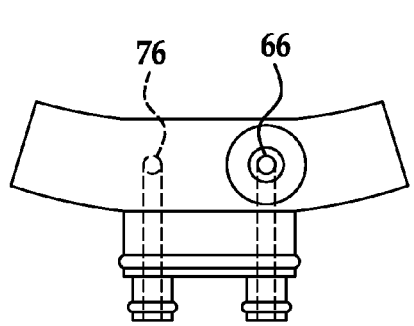
Figure 11B:
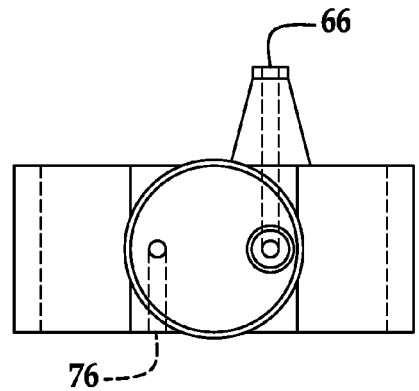
Figure 11C:
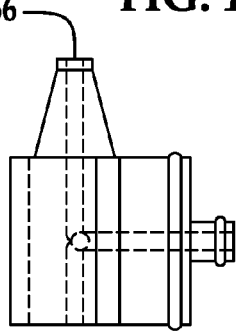
Figure 11D:
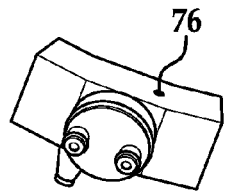
Figure 11E:
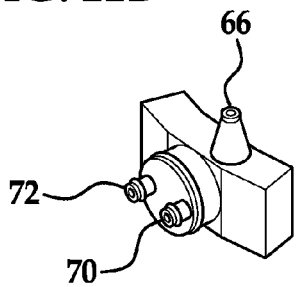

FIG. 4 shows a non-limiting cross sectional view of the outlet path through which the additive is allowed to leave the housing during desirable dispersement conditions while FIG. 5 shows a non-limiting cross sectional view of the inlet path wherein the "U" shaped inlet path is clearly illustrated.

In accordance with an exemplary embodiment of the present invention a method for determining the configuration of the inlet opening of the outlet path of the additive cartridge is provided below.

This analysis represents the design for a specific filter design application and is considered to be non-limiting in accordance with an exemplary embodiment of the present invention. Other filter designs, flow rates, tube diameters, and additive quantities and characteristics will be different depending on the engine parameters and other constraints.

Example Filter Design

Average flow rate through single filter at average speed of 60 mph −13.25 gpm.

Calculated average fluid velocity flowing past stagnation tube −2.22 ft/sec.

The fluid velocity can be calculated by knowing the area between the additive cartridge housing and the inner surface of the filter housing it is secured in, the flow rate of the fluid or oil passing through the filter can then be used to calculate the velocity of the fluid using known principles or formulas to calculate the velocity of the fluid passing through the filter.

A non-limiting example is produced below:

| Stagnation Pressure Calculations | | |
| --- | --- | --- |
| Pressure = ½ *mass density* V^2 | | |
| weight density of oil (lbs./cu. Ft) | 56.02 | |
| Mass density of oil - weight density/g (lb sec^2/ft^4) | 1.739751553 | |
| specific gravity of oil | 0.898 | |
| Pressure (lbs/ft^2) | 4.274813125 | |
| Stagnation Pressure (lbs/in^2) | 0.029686202 | 1.44 inch/H2O |

In one exemplary embodiment it is desirable to release all the additive from the chamber into the oil stream in 33,000 miles of engine use. With an average speed of 60 mph this equates to releasing all the additive in approximately 550 hours.

| Desired Additive Flow Rate | | | |
| --- | --- | --- | --- |
| Additive Volume | 138 ml | 0.036455857 | gallons |
| Release Time | 550 hrs | 33000 | Min. |
| Flow | 0.25090909 ml/hr | | |
| Flow (l/hr) | 0.00025091 l/hr | | |
| Flow (ml/min) | 0.00418182 ml/min | | |
| Flow (gal/min) | 0.00000110 gal/min | | |

| Tube Flow and Diameter Calculations | | |
| --- | --- | --- |
| Tube Flow - Darcy's equation | | |
| Delta P = 0.000273*uLQ/d^4 | | |

| diameter = (0.000273 uLQ/deltaP)^.25 | | |
| --- | --- | --- |
| u | 49.68 | abs vis. Centipoise |
| Q | 0.00000110 | flow - gallons/minute |
| L | 0.0833 | Length feet |
| d | To be calculated | diameter inches |
| Delta P | 0.029686202 | psid |
| Contstant | 0.000273 | |
| calc. diameter of outlet flow tube | 0.014319307 | |
| Tube Velocity | 1.584639 | in/minute |
|  | 0.002201 | ft/sec |
| Additive parameters | | |

| 41.4 cSt at 100 deg C. | Centistoke | 41.4 |
| --- | --- | --- |
| Spec grav. +1.2 | | 1.2 |

Final tube diameter of the outlet tube is selected for 0.015 inches inner diameter (ID) to account for variations. Accordingly, the inlet opening or inner diameter opening of the outlet tube is 0.015 inches for this example.

Below are some results of tests using a 0.0142 diameter tube for the outlet flow path.

Figure 13:
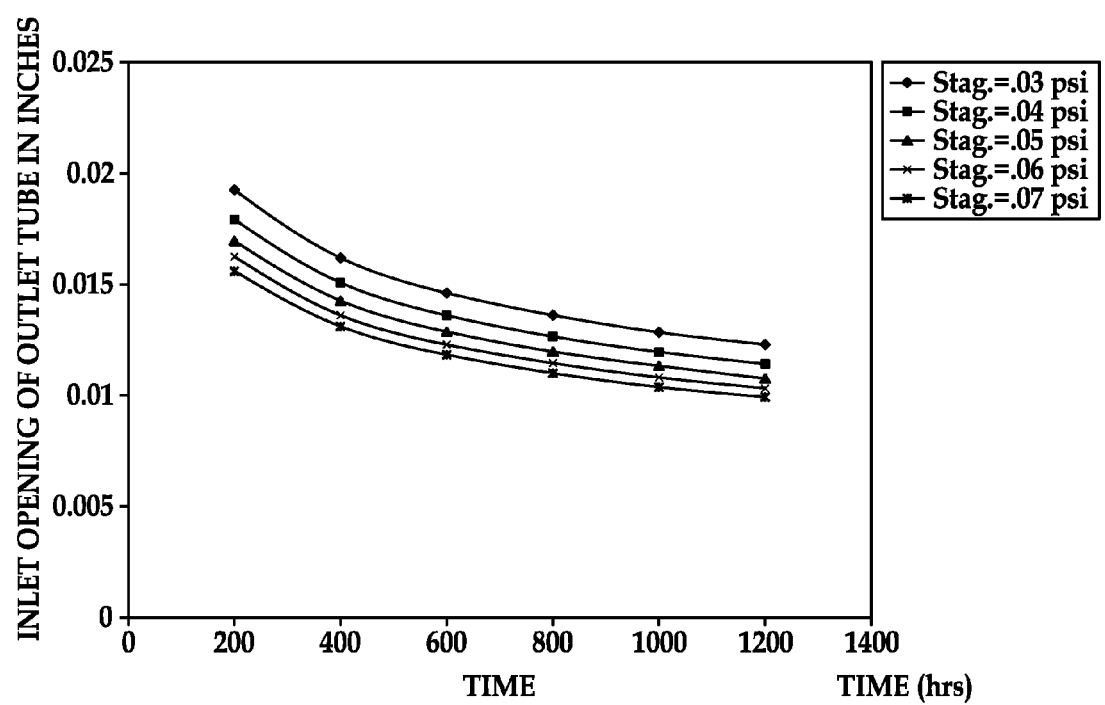
Figure 13A:
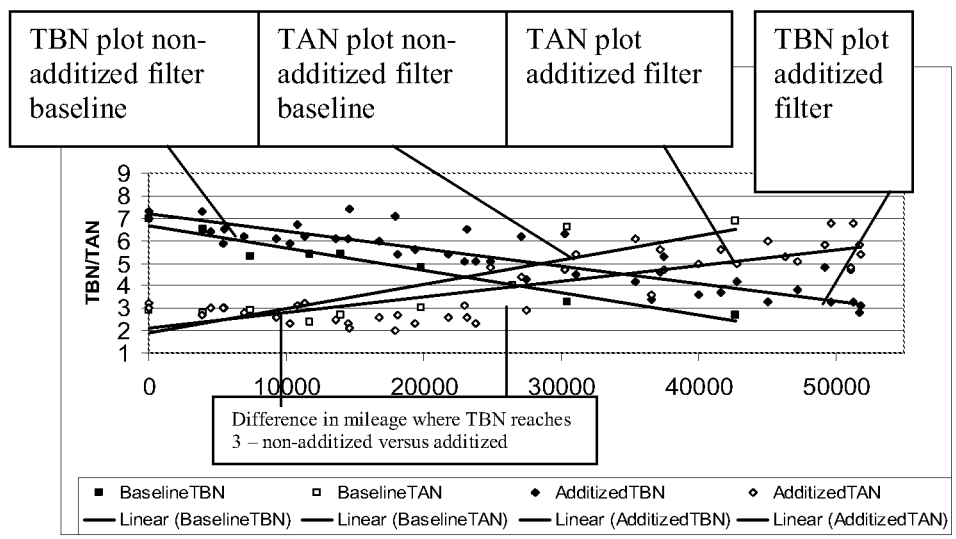
FIG. 13A illustrates a plot of TBN and TAN of additized and non-additized filters versus mileage.

Increase in oil change mileage can be determined based on cross-over point of TBN (total base number) and TAN (total acid number) lines or when TBN level reaches 3 (See FIG. 13A).

The square points and lines referred to as baseline represent oil sample analysis from engines with a non-additized filter, wherein the filled squares are TBN readings and the empty squares are TAN readings. The diamond points and lines referred to as additized oil filter represent oil sample analysis from engines utilizing the additive filter of exemplary embodiments of the present invention, wherein the filled diamonds are TBN readings and the empty diamonds are TAN readings. The mileage for the crossover point or level where the TBN reaches 3 is significantly higher with the additized oil filter of exemplary embodiments invention. Also, the TAN number of the baseline sample has a much higher slope thus, the TAN number increases quicker with than the oil with the additized filter in accordance with an exemplary embodiment of the present invention.

Figure 12:
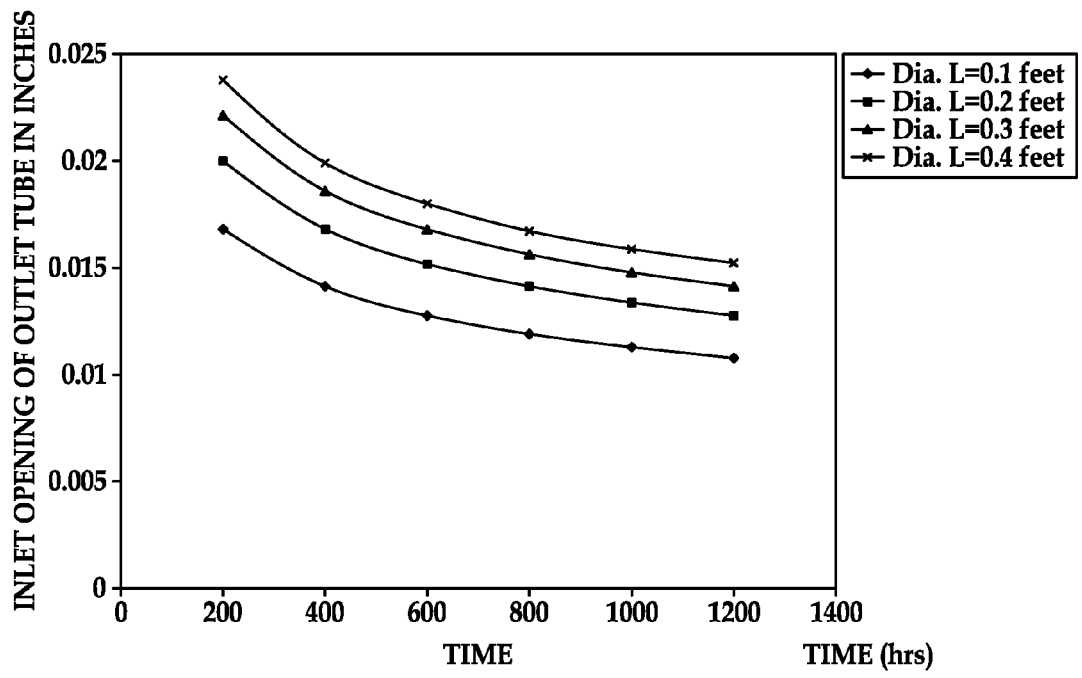
FIGS. 12-13 are graphs illustrating the flow rates of additive versus time illustrated data compiled in accordance with an exemplary embodiment of the present invention.

Below is the data for generating the graphs of FIGS. 12 and 13, wherein FIG. 12 illustrates data varying the inlet opening of the outlet tube or path along with length of the tube or path and time for dispersement of desired quantity of additive and FIG. 13 illustrates data varying the inlet opening of the outlet tube or path along with the stagnation pressure in the additive chamber and time for dispersement of desired quantity of additive.

| Time Hrs | Flow Rate gal/min | Dia. L = 0.1 | Dia. L = 0.2 | Dia. L = 0.3 | Dia. L = 0.4 |
| --- | --- | --- | --- | --- | --- |
| 200 | 0.0000030380 | 0.016795 | 0.019973 | 0.022104 | 0.023752 |
| 400 | 0.0000015190 | 0.014123 | 0.016795 | 0.018587 | 0.019973 |
| 600 | 0.0000010127 | 0.012762 | 0.015176 | 0.016795 | 0.018048 |
| 800 | 0.0000007595 | 0.011876 | 0.014123 | 0.01563 | 0.016795 |
| 1000 | 0.0000006076 | 0.011232 | 0.013357 | 0.014782 | 0.015884 |
| 1200 | 0.0000005063 | 0.010731 | 0.012762 | 0.014123 | 0.015176 |

| Time Hrs | Flow Rate gal/min | Stag. = .03 | Stag. = .04 | Stag. = .05 | Stag. = .06 | Stag. = .07 |
| --- | --- | --- | --- | --- | --- | --- |
| 200 | 0.0000030380 | 0.019251 | 0.017915 | 0.016943 | 0.016188 | 0.0155761 |
| 400 | 0.0000015190 | 0.016188 | 0.015065 | 0.014247 | 0.013612 | 0.0130979 |
| 600 | 0.0000010127 | 0.014628 | 0.013612 | 0.012874 | 0.0123 | 0.0118353 |

-continued

| Time Hrs. | Flow Rate gal/min | Stag. = .03 | Stag. = .04 | Stag. = .05 | Stag. = .06 | Stag. = .07 |
|---|---|---|---|---|---|---|
| 800 | 0.0000007595 | 0.013612 | 0.012668 | 0.011981 | 0.011447 | 0.0110139 |
| 1000 | 0.0000006076 | 0.012874 | 0.011981 | 0.01133 | 0.010826 | 0.0104163 |
| 1200 | 0.0000005063 | 0.0123 | 0.011447 | 0.010826 | 0.010343 | 0.0099522 |

The below data illustrates one non-limiting desired or calculated additive flow rate using an additive dispersement device in accordance with an exemplary embodiment of the present invention.

| Additive Flow Rate | | |
|---|---|---|
| Additive Volume | 138 ml | 0.036455857 gallons |
| Release Time | 800 hrs | 48000 min |
| Flow | 0.1725 ml/hr | |
|  | 0.0001725 l/hr | |
|  | 0.002875 ml/min | |
|  |  | 0.00000076 gal/min |

Referring now to FIGS. 14-25C, additive cartridges constructed in accordance with alternative exemplary embodiments of the present invention are illustrated. In one embodiment, additive cartridge 118 includes a housing portion 140 having a first chamber 142 and a second chamber 144. First chamber 142 is partially separated from second chamber 144 by a pair of dividing walls 146 and 148. Fluid communication is provided between the chambers and a metering opening 150 is provided in the exterior wall to allow the additive of first chamber 142 to pass therethough during usage of the filter. In an exemplary embodiment, metering opening configured to provide an adequate flow of additive into the oil flowing past the additive cartridge.

Additionally, a metering window 152 is provided at the bottom of dividing wall 148 to allow the additives of the second chamber to replenish the first chamber as they are dispersed from metering opening 150 during usage of the filter. In accordance with an exemplary embodiment the housing is filled with an additive preferably liquid in form and the top is secured to the housing and then the same is inverted (see FIG. 2) so that the metering opening is at the bottom to allow fluid flow between the chambers. In an exemplary embodiment, metering window 152 is rectangular in shape, has a height of $^{65}/_{1000}$ of an inch, and a width of $^{250}/_{1000}$ of an inch. Of course, metering windows larger, smaller, and of different shapes than the aforementioned window are contemplated to be within the scope of exemplary embodiments of the present invention.

Metering opening 150 and metering window 152 can both be sealed with an oil soluble material, which dissolves when the filter is used. In one exemplary embodiment, the oil soluble material may be a wax or, if applicable, the oil soluble material may comprise the additive disposed in the chambers 142 and 144 if the additive is a non-viscous material (for example, a gel).

In accordance with an exemplary embodiment of the present invention chambers 142 and 144 are filed with at least one liquid additive. For example, in one non-limiting exemplary embodiment, one additive can be an antioxidant and the other can be an over based detergent.

Of course, other additives are contemplated in accordance with exemplary embodiments of the present invention. In addition, housing 140 may be configured to have more than two chambers and multiple metering windows to allow additives to pass between the chambers.

Figure 14:
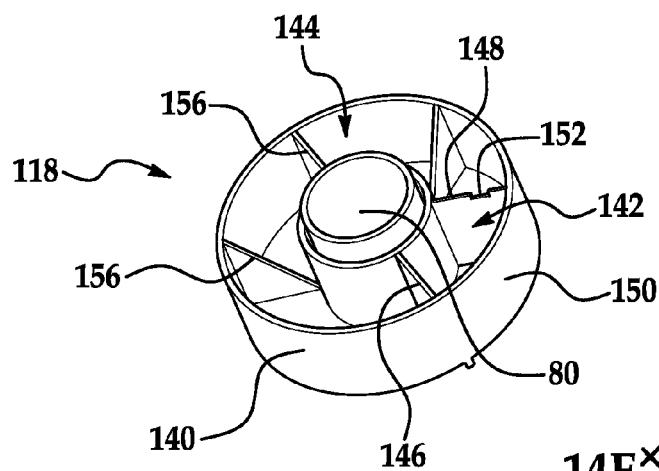
Figure 14A:
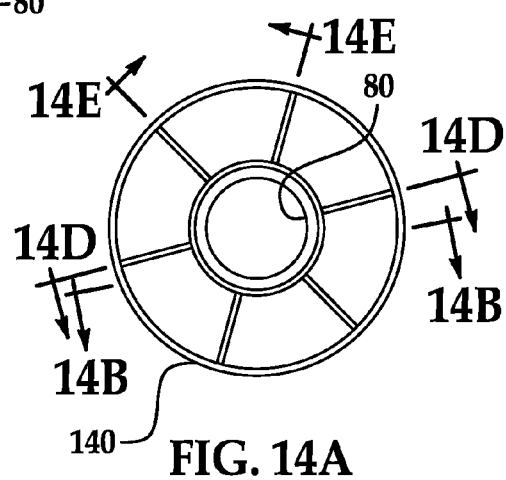
Figure 14B:
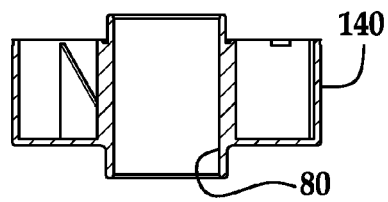
Figure 14C:
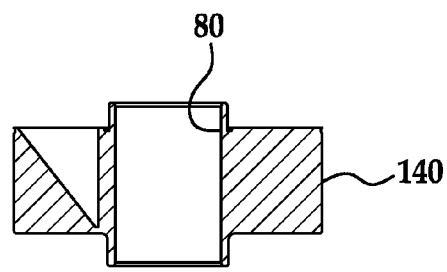
Figure 14D:
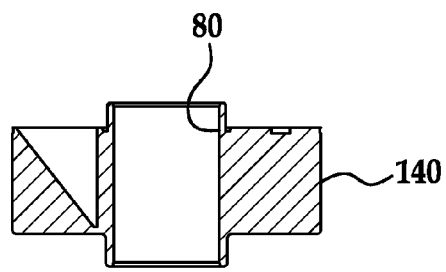
Figure 14E:
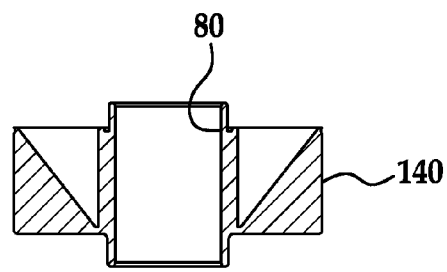
Figure 15:
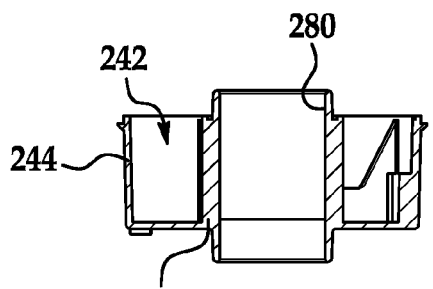
Figure 16:
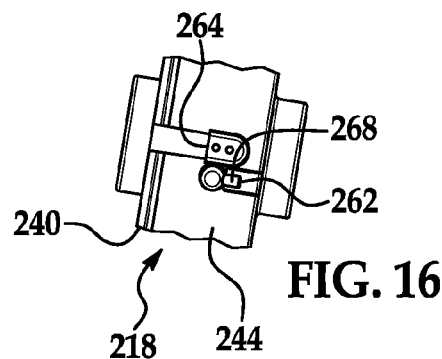

In non-limiting exemplary embodiments, the additives can be liquid in form, and the oil soluble sealing material over the metering opening 150 and in an alternative embodiment a wax may be positioned over the metering window 152, if necessary. In accordance with an exemplary embodiment the sealant can be a wax that melts away during use thereby uncovering the metering opening and the metering window. In other words, when the engine oil reaches operational temperature, the oil becomes hot enough to melt the wax so then the additives can be dispersed into the oil. As illustrated in FIG. 14 structural ribs 156, if necessary, are provided in the chamber.

The additive composition includes one or more additives which may be selected from the group including basic conditioners, corrosion inhibitors, metal deactivators, antioxidants, dispersants, friction modifiers, oil stabilizers, pour point depressants, detergents, viscosity index improvers, anti-wear agents, extreme pressure additives, mixtures of the above additives, and/or other known beneficial additives.

The basic conditioner of the additive cartridge, where used, is preferably a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

Of course, other compositions may be used as the additive (s). The material selected for the cartridge shell and cap is preferred to be a material which remains stable in a hot oil environment. Some exemplary materials are metals such as steel and oil-tolerant plastics such as, for example, polyacetals and glass filled Nylon (polyamide) for the shell and cap.

The additive cartridges described in the exemplary embodiments above allow the beneficial additive composition to be slowly released into the oil, thereby conditioning the oil in a metered manner over time.

By incorporating into the lube filter the needed additives, to reinforce the ones that are depleted, the lube filter can help extend the effective life of the oil back to pre-2002 emission regulation intervals and beyond. This is done by storing the required additive(s) in a storage basket(s) or other equivalent devices that reside inside the oil filter. The basket(s) can be located in the center tube portion of the mechanically active filter, above or below the mechanically active filter element or any combination thereof. The basket(s) may have a single or multiple pockets that can store the required additive(s). Each pocket will have a single or multiple holes to control the release rate of the additives that reside in each respective pocket. The number, size and location of the holes will be used to control the release rate of the additive(s). By properly controlling the release rate of the additive the effectiveness of the additives can be enhanced. A sensor may also be incorporated into the dome of the filter that will monitor oil condition and provide real-time feedback to the owner or operator of the truck.

The additive baskets would preferably be made from injection molded plastic. After the basket is molded the metering holes will be plugged with an oil soluble material capable of withstanding production and storage conditions, but also being able to release during operation of the truck to allow the release of additives within the given pockets. In production, after the metering holes are plugged the additive can be filled into each respective pocket. Once the additives have been put into the pocket the basket will be completely sealed and is ready for assembly into the lube filter. The basket can be sealed by a gasket with adhesive on one side or a cap that is vibration welded, spin welded or glued to the basket housing. After the additive basket is assembled into the lube filter, the lube filter is seamed up providing the final product. The final product will fit the specified applications with no modification to mounting parameters and will be installed in the same manner traditional lube filters are installed.

Referring now to FIGS. 14-25C, views illustrating an additive cartridge constructed in accordance with exemplary embodiments of the present invention are provided. Here components performing similar or analogous functions are identified with reference numerals having multiples of 100 with respect to the numerals used for similar components (e.g., FIGS. 1-11). As illustrated, outlet tube 274 is provided with a generally L-shaped geometry in which a first portion 273 extends generally horizontally proximate to the bottom of additive chamber 242 from outlet port 276 such that opening 276 is located beneath the additive level within additive chamber, and a second portion 275 extends generally vertically from the first portion adjacent exterior wall 244 from the outlet port to exit channel 272. The L-shaped geometry of outlet tube 274 in the present exemplary embodiment can provide for improved control of additive release.

In the present exemplary embodiment, as shown in the Figures, a separately molded connector 221 defines portions of the inlet and outlet fluid paths, and outlet tube 274 (e.g., metal or otherwise) is integrally molded with the connector wherein outlet tube 274 seals to outlet port 276 to provide a portion of the outlet fluid path. Moreover, connector 221 and housing 240 are configured so that once connector 221 is sealed within housing 240 via a snap fit or press fit arrangement with O-rings, sealants or other sealing means, opening 266 is located proximate to the top of the additive housing to be in fluid communication with an air chamber located above the additive level in additive chamber 242 or a portion of housing 240 not having additive disposed therein. Again, a "U" shaped inlet path is defined by opening 262, inlet channel 270 and opening 266 is provided although other configurations are contemplated in accordance with exemplary embodiments of the present invention. Once again, the opening 266 is disposed above the initial additive level in the additive chamber to allow for pressure equalization without additive dispersement during engine shut down.

Figure 17:
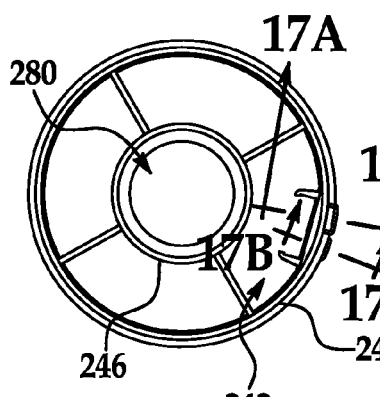
Figure 17A:
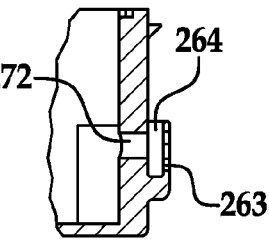
Figure 17B:
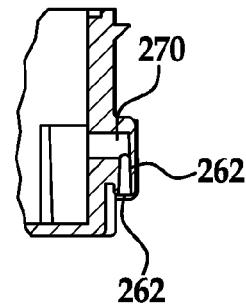
Figure 18A:
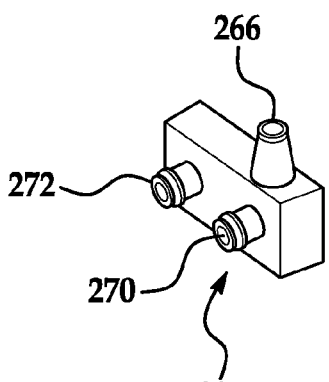
Figure 18B:
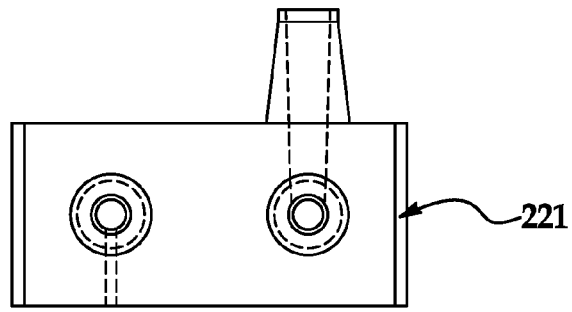
Figure 18C:
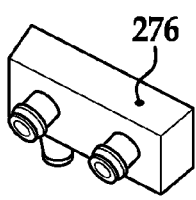
Figure 18D:
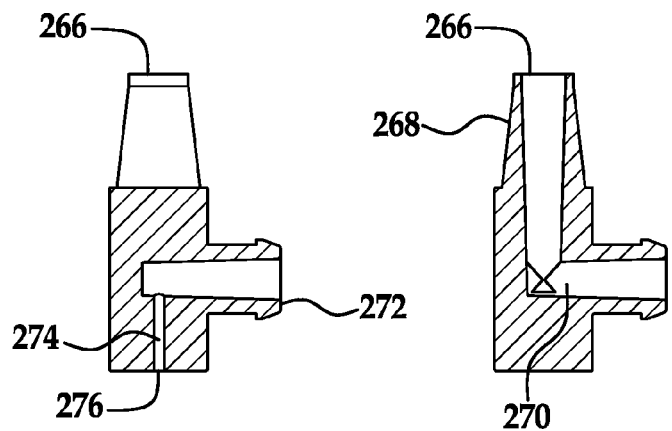
Figure 18E:
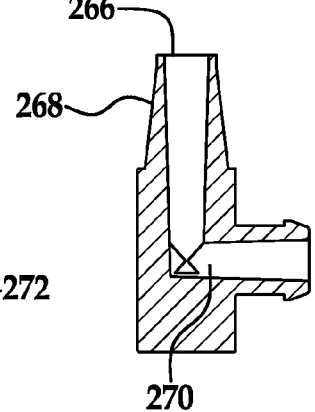
Figure 19:
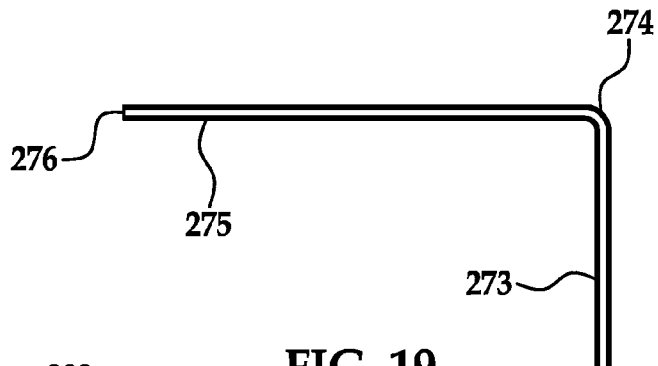
Figure 20:
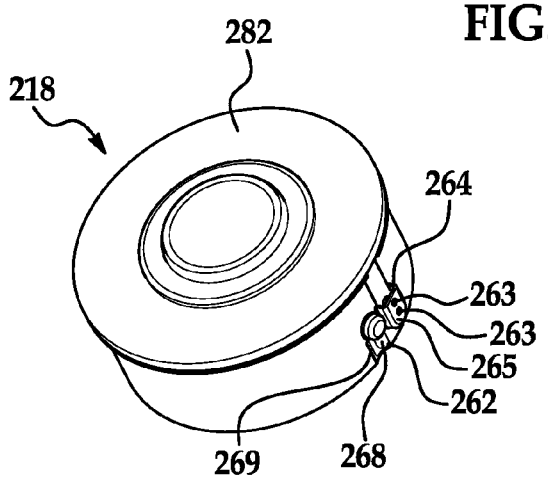
Figure 20A:
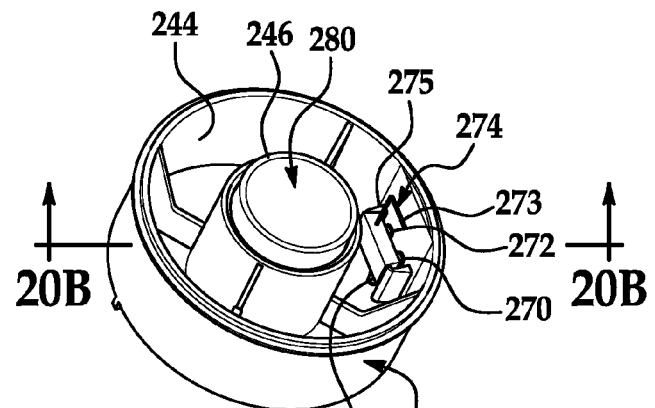
Figure 20B:
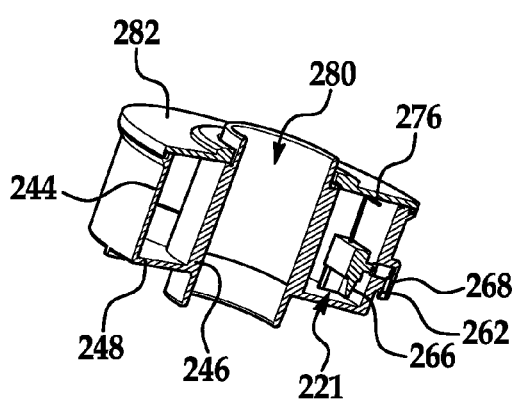
Figure 23A:
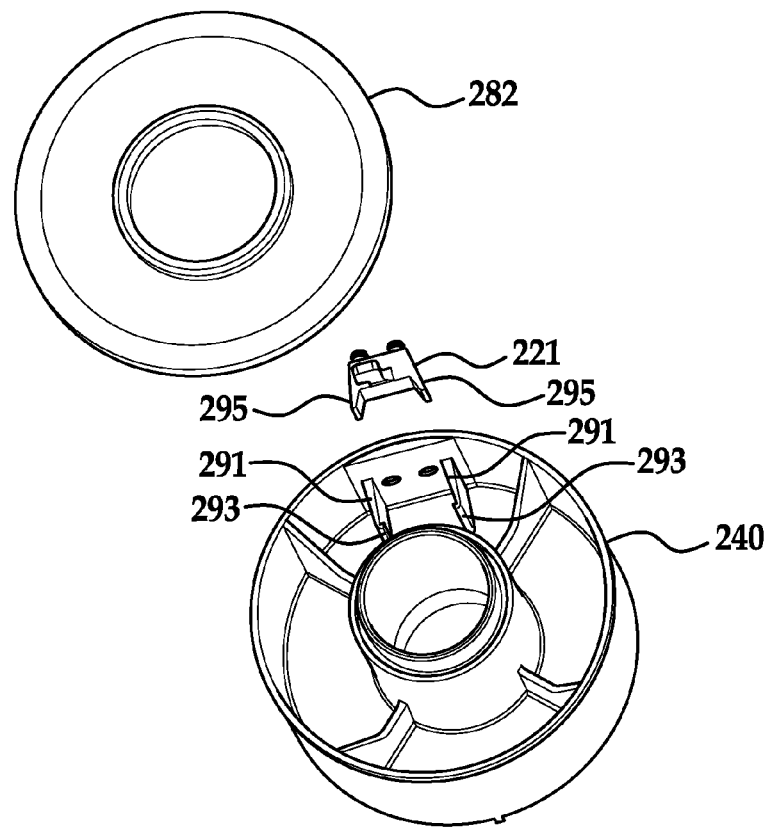
Figure 23B:
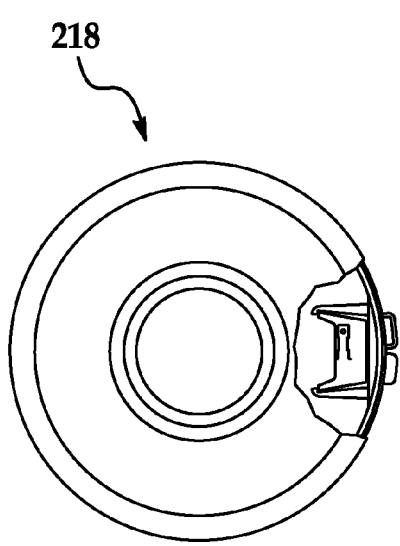
Figure 23C:
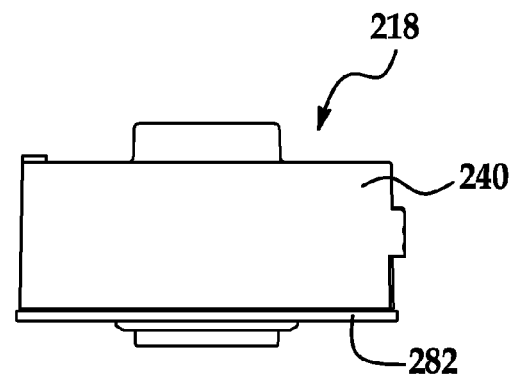

FIG. 17A also shows that, in the present exemplary embodiment, exit port 264 is configured to have a shroud portion 265 permitting the additive to be dispersed from the housing. Shroud portion 265 is configured to shield the outlet opening from the fluid being filtered by the filter. In other words, the shroud or shield portion provides an umbrella or canopy above the exit port 264. The shroud or shield or canopy portion 265 creates an iso-static pressure region so no additional pressure areas are created. In addition and as mentioned herein shroud 265 can also be configured to have openings 263. It should be noted that all dimensions shown in the Figures of the provisional applications the instant application is claiming priority to and incorporated herein are in inches. In one exemplary embodiment, a portion of a conduit defining the inlet path with inlet opening 62, 162 or 262 is received within a recessed area or cavity 269 and the inlet opening is disposed below a top surface of the additive cartridge when it is installed in the filter housing.

FIGS. 21A-25C illustrate other exemplary embodiments of the present invention and show the attachment of a separately molded connector 221 to the housing wherein the housing has a pair of tabs 291 each having a feature 293 configured to engage a pair of mounting features 295 of the separately molded connector as it is secured to the housing.

In another alternative exemplary embodiment, the shroud does not have any openings 263 and the shroud is in fact configured to create an iso-static pressure region in order to provide an additional suction force to pull the additive out of the outlet opening of the outlet path.

In still another alternative exemplary embodiment, it is contemplated that the inlet opening of the inlet path and the outlet opening of the outlet path can be located in opening 80 and the filtered fluid provides the stagnation pressure. Of course and in this embodiment, the inlet opening of the inlet path will need to be located to be facing the fluid flow.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for dispersing an additive from an additive cartridge disposed in a housing of an oil filter, the method comprising:
using stagnation pressure to disperse the additive from the additive cartridge; and
regulating a flow rate of the additive from the additive cartridge by enclosing the additive cartridge and providing an inlet path into the additive cartridge and an outlet path out of the additive cartridge, the inlet path having an inlet opening and the outlet path having an outlet opening,
wherein the inlet opening of the inlet path is located in an inlet flow path of a fluid about to be filtered by a filter element of the filter;
wherein the inlet path is provided by one or more tubes having a U-shaped geometry having a first leg, a second leg, and a connector portion disposed therebetween, the first leg providing the inlet opening and the second leg providing an outlet opening of the inlet path.

2. The method as in claim 1, wherein the additive comprises at least one additive selected from the group consisting of basic conditioners, corrosion inhibitors, metal deactivators, antioxidants, dispersants, friction modifiers, oil stabilizers, pour point depressants, detergents, viscosity index improvers, anti-wear agents, extreme pressure additives, and mixtures thereof and the additive is a liquid.

3. The method as in claim 1, wherein the additive comprises a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof and the additive is a liquid.

4. The method as in claim 1, wherein the inlet opening of the inlet path is configured to face the fluid flowing in the direction of the inlet flow path and the outlet opening of the outlet path is covered by a shroud.

5. The method as in claim 4, wherein the shroud defines an exit opening and the shroud has at least one opening in a portion of the shroud to prevent the fluid from creating a suction force at the outlet opening of the outlet path.

6. The method as in claim 1, wherein the additive cartridge is formed from an oil intolerable plastic and the additive is a liquid and the stagnation pressure is created by the fluid about to be filtered by the filter element of the oil filter.

7. The method as in claim 1, wherein a portion of the inlet path into the interior of the housing additive cartridge is provided by a connector separately inserted into the additive cartridge, wherein an outlet tube defining the outlet path is secured to the connector.

8. The method as in claim 7, wherein the connector is secured to the additive cartridge by engaging a pair of tabs secured to the additive cartridge.

9. A method for dispersing an additive from an additive cartridge disposed in a housing of an oil filter, the method comprising:
   using stagnation pressure to disperse the additive from the additive cartridge;
   regulating a flow rate of the additive from the additive cartridge by restricting an inlet opening of an outlet tube of the additive cartridge, wherein the additive cartridge comprises:
   an additive cartridge housing having a top, a bottom and an outer peripheral wall extending therebetween, the outer peripheral wall defining an exterior surface of the additive cartridge housing, the additive cartridge housing defining a receiving area for receipt of the additive therein;
   a fluid inlet path through the outer peripheral wall of the additive cartridge housing, the fluid inlet path having an inlet opening disposed on the outer peripheral wall of the additive cartridge housing;
   a fluid outlet path through the outer peripheral wall of the additive cartridge housing, the fluid outlet path being at least partially defined by the outlet tube and the fluid outlet path providing a means for dispersing the additive from the receiving area when the pressure within the receiving area exceeds a predetermined value, wherein the inlet opening of the fluid inlet path is located in an inlet flow path of the fluid flowing into the filter housing;
   wherein fluid flow of the additive through the fluid outlet path is controlled by the inlet opening of the outlet tube; and
   wherein the inlet path is provided by one or more tubes having a U-shaped geometry having a first leg, a second leg, and a connector portion disposed therebetween, the first leg providing the inlet opening and the second leg providing an outlet opening of the inlet path, the outlet opening of the inlet path being located in an air pocket above a surface level of the additive disposed in the additive cartridge.

10. The method as in claim 9, wherein the shroud defines an exit opening and the shroud has at least one opening in a portion of the shroud to prevent the fluid from creating a suction force at the outlet opening of the fluid outlet path.

11. The method as in claim 9, wherein the additive cartridge housing is formed from an oil intolerable plastic and the additive is a liquid and the pressure is created by the fluid flowing into the filter.

12. The method as in claim 9, wherein the filter is an oil filter.

13. The method as in claim 9, wherein a portion of the fluid inlet path into the receiving area of the additive cartridge housing is provided by a connector separately inserted into the additive cartridge housing, the connector further having the outlet tube secured thereto.

14. The method as in claim 13, wherein the connector is secured to the additive cartridge housing by engaging a pair of tabs secured to the additive cartridge housing.

15. A method for dispersing an additive from an additive cartridge disposed in a housing of an oil filter, the method comprising:
   using stagnation pressure to disperse the additive from the additive cartridge;
   regulating a flow rate of the additive from the additive cartridge, wherein the additive cartridge comprises:
   an additive cartridge housing defining a receiving area for receipt of the additive;
   a fluid inlet path through a wall of the additive cartridge housing, the fluid inlet path providing a means for increasing a pressure within the receiving area, the fluid inlet path having an inlet opening disposed in the wall of the additive cartridge housing;
   a fluid outlet path through the wall of the additive cartridge housing, the fluid outlet path providing a means for dispersing the additive from the receiving area when the pressure within the receiving area exceeds a predetermined value, the fluid outlet path having an outlet opening disposed in the wall of the additive cartridge housing; and
   wherein the inlet path is provided by one or more tubes having a U-shaped geometry having a first leg, a second leg, and a connector portion disposed therebetween, the first leg providing the inlet opening and the second leg providing an outlet of the opening of the inlet path the outlet opening of the inlet path being located in an air pocket above a surface level of the additive disposed in the additive cartridge.

16. The method as in claim 15, wherein the outlet opening is covered by a shroud configured to deflect fluid flowing in a first direction away from the outlet opening, the shroud defines an exit opening, and the shroud has at least one opening in a portion of the shroud to prevent the fluid from creating a suction force at the outlet opening of the fluid outlet path and the additive cartridge is centrally located in the filter housing and the inlet opening of the fluid inlet path is located below a top surface of the additive cartridge and a cavity is formed in the outer wall adjacent to the inlet opening of the fluid inlet path.

17. The method as in claim 9, wherein the shroud extends away from an outer peripheral wall of the additive cartridge housing.

18. The method as in claim 17, wherein the shroud provides an enclosure that surrounds the outlet opening and, the enclosure has an exit opening in fluid communication with the outlet opening and the shroud further comprises at least one other opening in a portion of the shroud to prevent the fluid from creating a suction force at the outlet opening of the fluid outlet path.

19. The method as in claim 16, wherein the shroud provides a canopy above the outlet opening when the additive cartridge is installed in the filter housing.

20. A method of dispersing an additive from an additive cartridge disposed in a housing of an oil filter, the method comprising:
- providing an inlet path that receives a fluid flowing in an inlet flow path of the oil filter, an inlet opening of the inlet path located in the inlet flow path before the filter element, the inlet path configured to transport fluid from outside of the additive cartridge to an interior area of the additive cartridge;
- providing an outlet path that transports a liquid from the interior area of the additive cartridge to outside of the additive cartridge and disperses the liquid into the inlet flow path, an outlet opening of the outlet path also located in the inlet flow path before the filter element; and
- using stagnation pressure of fluid flowing through the inlet path to disperse the liquid from the outlet path;
- wherein the inlet path is provided by one or more tubes having a U-shaped geometry having a first leg, a second leg, and a connector portion disposed therebetween, the first leg providing the inlet opening and the second leg providing an outlet opening of the inlet path.

21. The method of claim 20, wherein a portion of the fluid flowing through the inlet path displaces a portion of the liquid inside the additive cartridge such that the portion of the liquid is pushed out of the additive cartridge through the outlet path.

22. The method of claim 20, wherein the liquid transported out of the additive cartridge by the outlet path comprises the additive, an oil, or a mixture of both the additive and the oil.

* * * * *